(12) United States Patent
 Puzik et al.

(10) Patent No.: US 10,655,642 B2
(45) Date of Patent: May 19, 2020

(54) COMPRESSOR, EXHAUST GAS TURBOCHARGER AND INTERNAL COMBUSTION MACHINE

(71) Applicant: Volkswagen Aktiengesellschaft, Wolfsburg (DE)

(72) Inventors: Alois Puzik, Braunschweig (DE); Thomas Meier, Allenbüttel (DE); Thilo Lehmann, Berlin (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 370 days.

(21) Appl. No.: 15/820,493

(22) Filed: Nov. 22, 2017

(65) Prior Publication Data
US 2018/0094647 A1 Apr. 5, 2018

Related U.S. Application Data

(63) Continuation of application No. PCT/EP2015/059847, filed on May 3, 2016.

(30) Foreign Application Priority Data

May 27, 2015 (DE) .................. 10 2015 209 666

(51) Int. Cl.
 *F04D 29/66* (2006.01)
 *F04D 29/44* (2006.01)
 (Continued)

(52) U.S. Cl.
 CPC .............. *F04D 29/667* (2013.01); *F02C 6/12* (2013.01); *F04D 27/0246* (2013.01);
 (Continued)

(58) Field of Classification Search
 CPC .............. F04D 29/667; F04D 29/4213; F04D 27/0246; F04D 29/4206; F04D 29/441;
 (Continued)

(56) References Cited

U.S. PATENT DOCUMENTS 9,777,737 B2 * 10/2017 Houst ................ F02B 37/22
10,167,877 B2 * 1/2019 Ibaraki ............... F04D 29/464
(Continued)

FOREIGN PATENT DOCUMENTS

CN 201802524 U 4/2011
CN 103148021 A 6/2013
(Continued)

OTHER PUBLICATIONS

Search Report issued by the Japan Patent Office and machine translation thereof for Japanese Patent Application No. 2017-550593, drafted on Aug. 17, 2018.
(Continued)

*Primary Examiner* — Laert Dounis
*Assistant Examiner* — Edward Bushard
(74) *Attorney, Agent, or Firm* — Manfred Beck, P.A.

(57) ABSTRACT

A compressor for an internal combustion machine includes a compressor impeller rotatably mounted in a compressor casing. A circumferential step is integrated into a wall which delimits an intake section disposed upstream of the compressor impeller in an operating flow direction of a gas to be compressed. The circumferential step is a mouth-free circumferential step which faces the compressor impeller and delimits a flow cross section. A ratio of a shortest distance between the compressor impeller and the circumferential step to a largest cross-sectional dimension in the flow cross section delimited by the circumferential step is at least 0.5. An exhaust gas turbocharger and an internal combustion machine are also provided.

22 Claims, 13 Drawing Sheets

(51) Int. Cl.
 *F04D 27/02* (2006.01)
 *F04D 29/42* (2006.01)
 *F02C 6/12* (2006.01)
 *F02B 37/00* (2006.01)
 *F02B 39/04* (2006.01)
 *F02B 39/10* (2006.01)

(52) U.S. Cl.
 CPC ..... *F04D 29/4206* (2013.01); *F04D 29/4213* (2013.01); *F04D 29/441* (2013.01); *F02B 37/00* (2013.01); *F02B 39/04* (2013.01); *F02B 39/10* (2013.01); *F05D 2220/40* (2013.01); *F05D 2260/96* (2013.01)

(58) Field of Classification Search
 CPC .... F02C 6/12; F05D 2260/96; F05D 2220/40; F02B 39/10; F02B 39/04; F02B 37/00
 See application file for complete search history.

(56) References Cited

U.S. PATENT DOCUMENTS

| | | |
|---|---|---|
| 2002/0071765 A1 | 6/2002 | Sahay et al. |
| 2003/0131596 A1 | 7/2003 | Sumser et al. |
| 2007/0266705 A1 | 11/2007 | Wood et al. |
| 2010/0111676 A1 | 5/2010 | Hollnbuchner et al. |
| 2010/0122531 A1 | 5/2010 | Capon et al. |
| 2011/0173975 A1 | 7/2011 | Sun et al. |
| 2011/0214421 A1 | 9/2011 | Schmitt et al. |
| 2011/0255952 A1 | 10/2011 | Williams et al. |
| 2014/0308110 A1 | 10/2014 | Houst et al. |
| 2015/0354591 A1 | 12/2015 | Ibaraki et al. |
| 2016/0069302 A1 | 3/2016 | Tabata |

FOREIGN PATENT DOCUMENTS

| | | |
|---|---|---|
| CN | 103917760 A | 7/2014 |
| DE | 101 58 874 A1 | 6/2003 |
| DE | 10 2004 024 949 A1 | 12/2005 |
| DE | 10 2007 019 884 A1 | 11/2008 |
| DE | 10 2009 046 522 A1 | 5/2010 |
| DE | 10 2010 026 176 A1 | 1/2012 |
| DE | 10 2010 028 975 A1 | 3/2012 |
| DE | 10 2011 017 419 A1 | 4/2012 |
| DE | 11 2009 002 683 T5 | 3/2013 |
| DE | 10 2014 018 035 A1 | 6/2015 |
| FR | 2434 939 A | 3/1980 |
| JP | S57-068113 A | 4/1982 |
| JP | 2012-184751 A | 9/2012 |
| WO | 2013/074503 A1 | 5/2013 |
| WO | 2014/128931 A1 | 8/2014 |
| WO | 2014/170954 A1 | 10/2014 |
| WO | 2015/066301 A1 | 5/2015 |

OTHER PUBLICATIONS

Office Action issued by the Japan Patent Office and machine translation thereof for Japanese Patent Application No. 2017-550593, drafted on Aug. 28, 2018.
Office Action, dated Nov. 28, 2018, issued by the National Intellectual Property Administration, P.R. China for Chinese Patent Application No. 201680030649.5, which is related to U.S. Appl. No. 15/820,493; an English language translation of the rejection arguments being attached to the Office Action.
Search Report, dated Nov. 19, 2018, issued by the National Intellectual Property Administration, P.R. China for Chinese Patent Application No. 201680030649.5 and translation.
Search Report including Provisional Assessment of Patentability issued by the German Patent and Trademark Office for German Patent Application No. DE 10 2015 209 666.1, dated Jan. 19, 2016.
International Search Report for International Application No. PCT/EP2016/059847 and translation thereof, dated Aug. 26, 2016.
Written Opinion of the International Search Authority for International Application No. PCT/EP2016/059847, Form PCT/ISA/237.
International Preliminary Report on Patentability for International Application No. PCT/EP2016/059847, Chapter II, Form PCT/IPEA/409, dated Mar. 17, 2017.
English Translation of International Preliminary Report on Patentability for International Application No. PCT/EP2016/059847, Chapter II.

\* cited by examiner

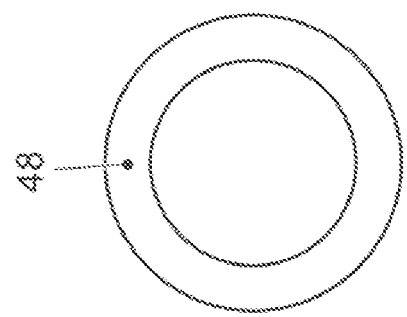
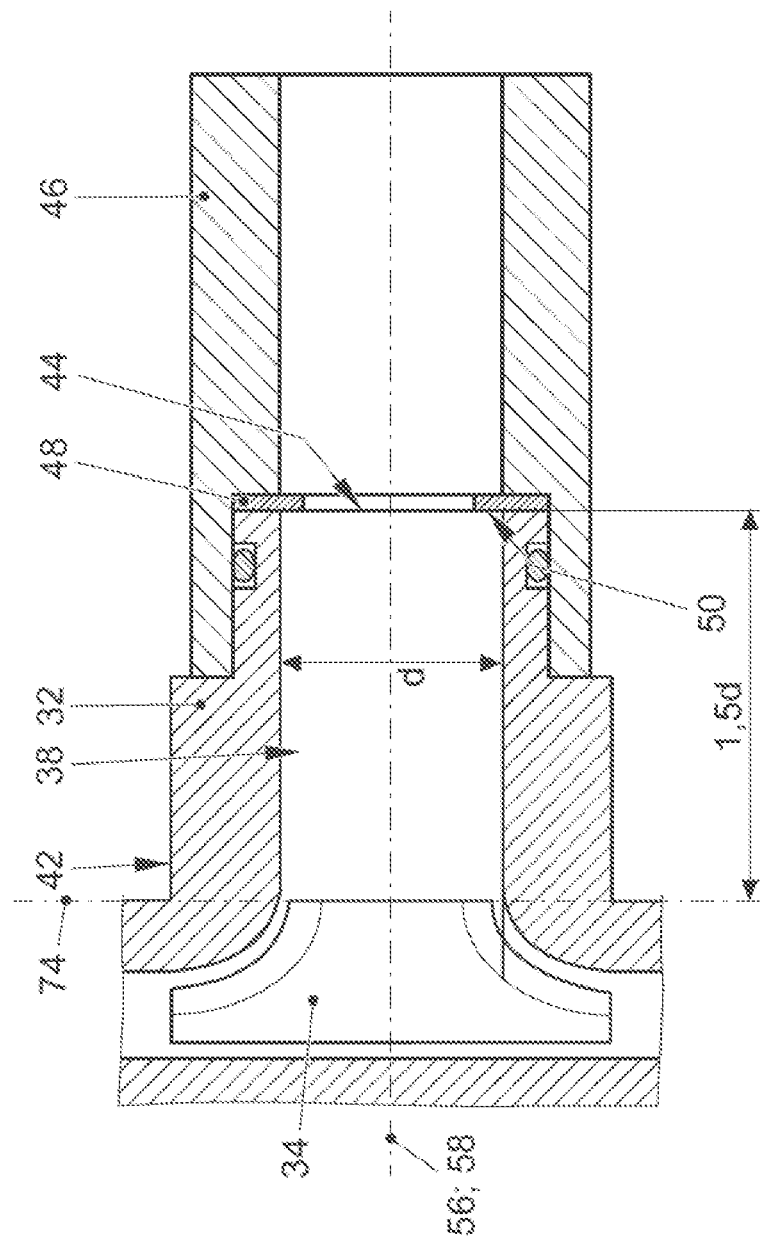
FIG. 6
FIG. 5

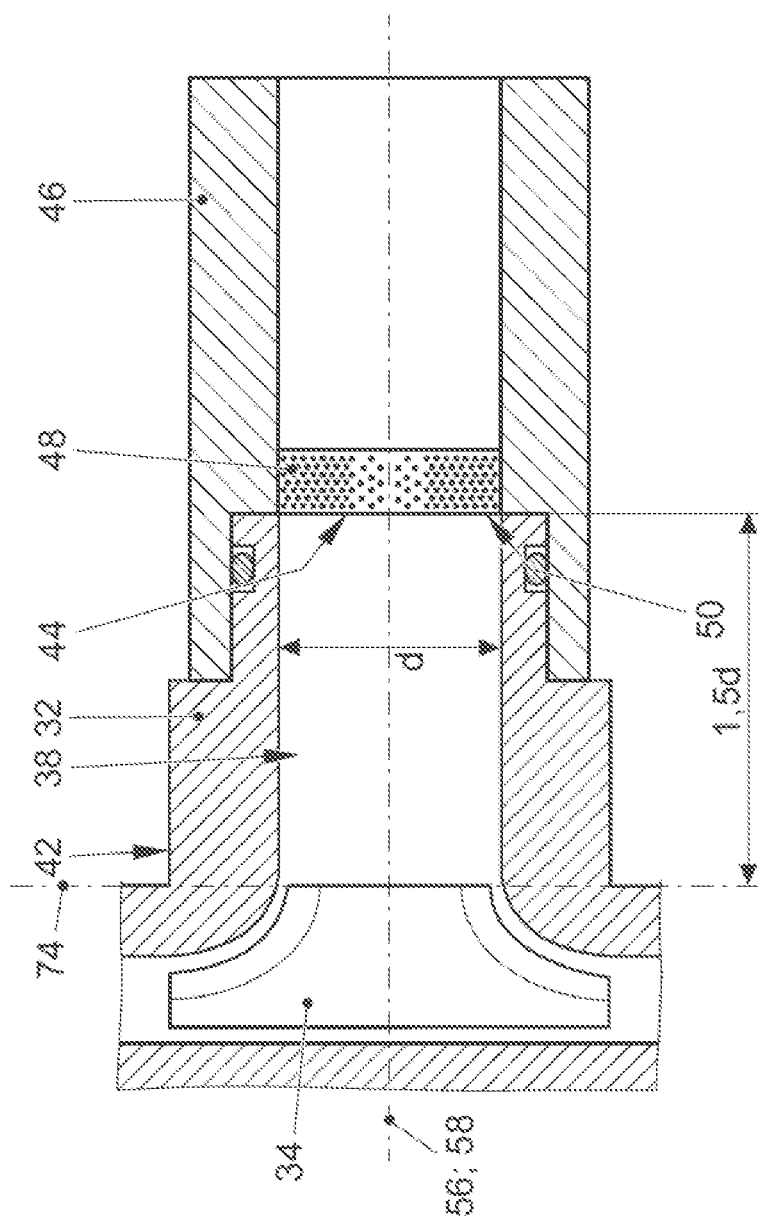

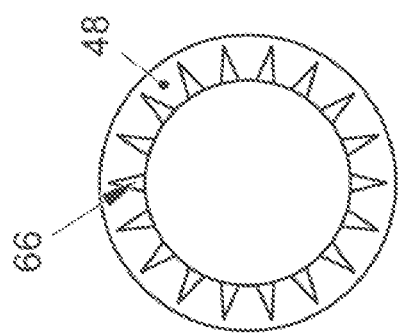
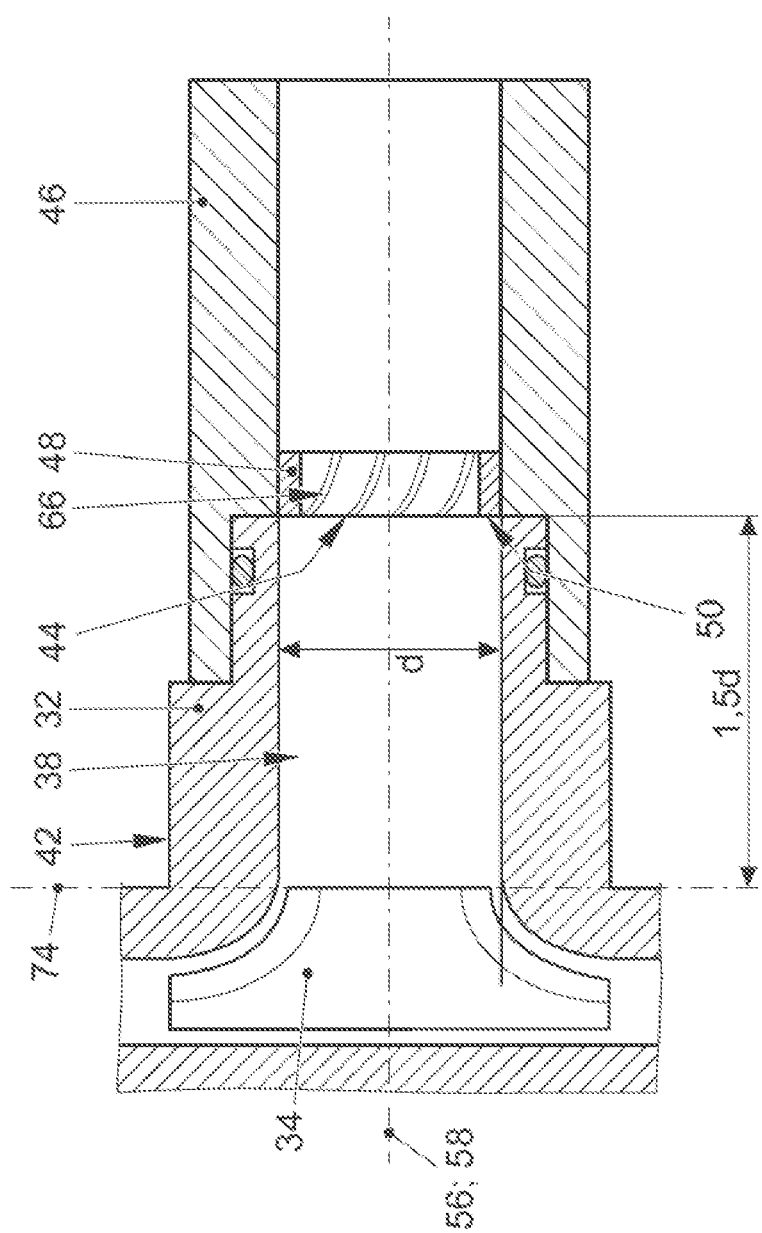
FIG. 14
FIG. 13

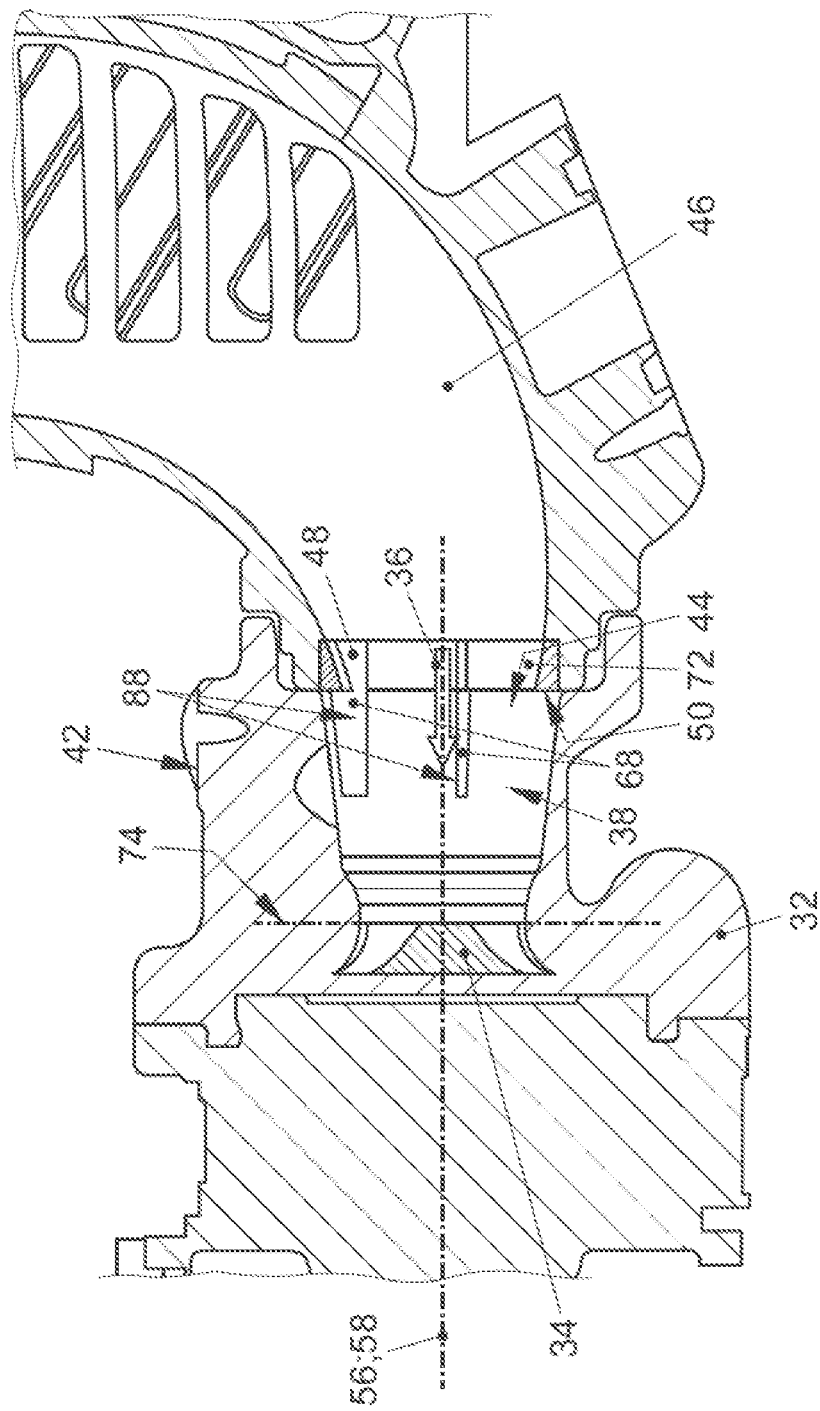

COMPRESSOR, EXHAUST GAS TURBOCHARGER AND INTERNAL COMBUSTION MACHINE

CROSS-REFERENCE TO RELATED APPLICATIONS

This application is a continuation, under 35 U.S.C. § 120, of copending International Application No. PCT/EP2016/059847, filed May 3, 2016, which designated the United States; this application also claims the priority, under 35 U.S.C. § 119, of German Patent Application No. DE 10 2015 209 666.1, filed May 27, 2015; the prior applications are herewith incorporated by reference in their entirety.

BACKGROUND OF THE INVENTION

Field of the Invention

The invention relates to a compressor for an internal combustion machine. The invention also relates to an exhaust gas turbocharger and to an internal combustion machine, having a compressor in each case.

The use of one or more compressors for increasing the specific power output and for reducing the specific fuel consumption of internal combustion machines is known. The compressors in this case are for the most part configured as part of exhaust gas turbochargers.

Compressors for passenger car applications are usually embodied as turbocompressors since with these high volumetric flows can be delivered in comparison to displacement compressors and the comparatively low compression exit pressures which are achievable with these are sufficient for most passenger car applications. As turbocompressors, these have a compressor impeller which is arranged inside a flow chamber which is formed by a compressor casing, as a result of which the flow chamber is divided into a low-pressure chamber located upstream of the compressor impeller and a high-pressure chamber located downstream of the compressor impeller.

One problem that results from the design of compressors in the form of turbocompressors is the possibility of a backflow of already compressed fresh gas as a result of the only incomplete separation of the high-pressure and low-pressure chambers from each other. This can prove to be problematic especially when on the high-pressure side of the fresh gas tract, the so-called charge air section, an unusually large overpressure is temporarily established, as can be the case for example if a throttle valve, integrated into the charge air section, which was previously wide open is quickly closed. The inertia of the "internal combustion machine" system can then lead to the compressor continuing to deliver output with possibly high compression power into the charge air section which is already interrupted by the closed throttle valve, which leads to a correspondingly high compression exit pressure and a correspondingly high pressure difference of the gas pressures in the high-pressure chamber and also in the low-pressure chamber of the compressor.

A backflow of already compressed fresh gas via the compressor impeller into the low-pressure chamber of the compressor can propagate in a wave-like manner, which can lead to a corresponding vibration excitation of the compressor casing and especially of a gas conducting pipe, connected to a compressor inlet, of the fresh gas tract. The noise development which is associated with this vibration excitation is frequently also referred to as "discharge hissing".

Such a discharge hissing can be avoided by the integration of an air recirculation valve (diverter valve) into a compressor or into the charge air section of the fresh gas tract, wherein such an air recirculation valve prevents a backflow through the compressor impeller. The costs associated therewith are relatively high, however. Furthermore, provision can be made for an integration of sound attenuating elements into the section of the fresh gas tract located upstream of the compressor inlet, which reduce the effects of vibration excitation and therefore the discharge hissing. This, however, is also associated with relatively high costs. Moreover, this measure requires a relatively large installation space.

Known from German Patent Application Publication No. DE 10 2007 019 884 A1 is a compressor for an exhaust gas turbocharger, the compressor casing of which in the region of the inlet pipe has on the inner side radially encompassing recesses by means of which the flow noises during normal operation of the compressor and acoustic effects in the surge case are to be reduced. In this case, the radially encompassing recesses are to have undercuts against the flow direction of the gas. In the surge case, the backflowing fresh gas is intended to make its way into the undercuts where this rotates along the circumference, which is to lead to an altogether greater backflow resistance which is to weaken the surging in duration and amplitude.

Known also from German Patent Application Publication No. DE 10 2014 018 035 A1 is an air duct for an induction tract of an internal combustion machine which in a first connection region can be connected to an air mass meter and in a second connection region is intended for a connection to a compressor of an exhaust gas turbocharger. In a section between these connection regions provision is made for a connection point for connection to a crankcase breather of the internal combustion machine. In a section between the second connection region and the connection point, the air duct on its inner side forms a plurality of radially inwardly extending guide fins which in the main run parallel to the longitudinal direction of the air duct, which fins disturb a vortex flow flowing back from the compressor and therefore is to reduce an impingement of the air mass meter by oil which was introduced into the air duct via the crankcase breather.

German Patent Application Publication No. DE 10 2010 026 176 A1 discloses a compressor with a cone arranged in an intake section of a casing of the compressor, the inside diameter of which can be altered by means a pressurized fluid which is to be supplied, in order to periodically bring about to a greater or lesser extent an overlapping of the inlet cross section of the compressor impeller. As a result, the compressor characteristic map within which the compressor is to be operated in a stable manner can be broadened.

Compressors which are comparable to this are also known from French Patent Application Publication No. FR 2 434 939 A1 and International Publication No. WO 2014/128 931 A1, wherein instead of a variable cone annular barrier elements, which can be altered with regard to their radial inside diameter, are used there.

A radial compressor for an internal combustion machine is known from German Patent Application Publication No. DE 10 2011 017 419 A1, in which a relief duct, which opens into an intake section of the compressor casing upstream of the compressor impeller, goes out from the encompassing gap between the compressor impeller and the adjoining section of the compressor casing.

Compressors which are comparable to this are also known from Japanese Patent Application Publication No. JP 2012-184751 A, International Publication No. WO 2015/066301

A1 and U.S. Patent Application Publication No. US 2007/0266705 A1, wherein in the case of the compressor according to JP 2012-184751 A a plurality of plate-like elements in a spiral orientation, distributed with uniform pitch along the inner side of the intake section, are provided in the region of the mouth of the relief duct.

A compressor for an internal combustion machine is also known from International Publication No. WO 2014/170954 A1, in which the compressor casing, in the region of an intake section, forms an annularly encompassing duct which in one section is connected to the intake section and opens into an exhaust gas return duct.

SUMMARY OF THE INVENTION

It is accordingly an object of the invention to provide a compressor, an exhaust gas turbocharger, and an internal combustion machine which overcome the above-mentioned disadvantages of the heretofore-known devices of this general type. It is in particular an object of the invention to reduce a discharge hissing in a compressor for an internal combustion machine as much as possible by using the simplest means possible.

With the foregoing and other objects in view there is provided, in accordance with the invention, a compressor for an internal combustion machine, including:

a compressor casing;

a compressor impeller rotatably mounted in the compressor casing;

a wall delimiting an intake section, the intake section being disposed upstream of the compressor impeller in an operating flow direction of a gas to be compressed;

a circumferential step integrated into the wall, the circumferential step being a mouth-free circumferential step facing the compressor impeller; and the circumferential step delimiting a flow cross section, wherein a ratio of a shortest distance between the compressor impeller and the circumferential step to a largest cross-sectional dimension in the flow cross section delimited by the circumferential step is at least 0.5.

In other words, according to the invention there is provided a compressor for an internal combustion machine with a compressor impeller which is rotatably mounted in a compressor casing and an intake section which lies upstream of the compressor impeller in the operating flow direction of a gas which is to be compressed, wherein a mouth-free circumferential step which faces the compressor impeller is integrated into a wall which delimits the intake section and the ratio of the shortest distance between the compressor impeller and the circumferential step on the one hand and the largest cross-sectional dimension in the flow cross section which is delimited by the circumferential step on the other hand is at least 0.5.

Advantageous embodiments of the compressor according to the invention and therefore of the exhaust gas turbocharger according to the invention and the internal combustion machine according to the invention are the subject matter of the patent claims and/or are gathered from the following description of the invention.

The invention is based on the knowledge that a backflow of already compressed fresh gas via the compressor impeller of a compressor integrated into the fresh gas tract, which is caused by a relatively fast closing of a throttle valve arranged in the charge air section of a fresh gas tract of an internal combustion machine, takes place in the form of a vortex flow (swirling flow) close to the wall. The backflow therefore takes place in a spiral manner along the inner wall of the low-pressure chamber and continues in this form right into a gas conducting pipe which is connected upstream to the compressor inlet (with regard to the operating flow direction of the gas which is to be compressed, in which this flows from the low-pressure side to the high-pressure side of the compressor or of the fresh gas tract). This does not only lead to an airborne sound emission via the intake port but also to a vibration excitation of especially the gas conducting pipes forming the intake section of the fresh gas tract, partially within the range of their natural frequencies. All this together leads to the undesirable noise development which is also referred to as discharge hissing.

On the basis of this knowledge, the invention is based on the idea that the propagation of this vortex flow close to the wall and especially the overflow into a gas conducting pipe which is connected upstream to the compressor inlet can be reduced or disturbed in a constructionally simple manner by a flow resistance in the form of a suitably configured step being integrated into the intake section of the compressor. Since the gas flows back in the form of both a flow component in the longitudinal direction and a vortex flow pointing in the circumferential direction, a disturbance of this backflow can basically be carried out both by means of a step which is transverse to, and especially perpendicular to, the flow component which is oriented in the longitudinal direction, and by means of a step which lies transversely to the flow component which is oriented in the circumferential direction. A step which is oriented transversely to, and especially perpendicularly to, the flow component of the vortex flow which is oriented in the longitudinal direction has proved to be particularly effective in this case.

Consequently, in the case of a compressor for an internal combustion machine, which has at least a compressor impeller rotatably mounted in a compressor casing and an intake section which is disposed upstream of the compressor impeller in the operating flow direction of a gas which is to be compressed, it is provided according to the invention that at least a mouth-free circumferential step, facing the compressor impeller, is integrated into a wall which delimits the intake section.

According to a feature of the invention, the circumferential step and/or a longitudinal step has a step angle, wherein the step angle is in a value range of 80° to 100°, and preferably substantially 90°.

In this case, the circumferential step facing the compressor impeller, or a plane defined by this circumferential step, can be oriented parallel or obliquely (angle between >0° and <90°) to the inlet plane of the compressor impeller. The inlet plane of the compressor impeller constitutes in this case that plane lying perpendicularly to the rotational axis of the compressor impeller which includes the point of the compressor impeller located closest to the low-pressure chamber.

According to the invention, such a compressor is furthermore characterized in that the ratio of the shortest distance between the compressor impeller and the circumferential step on the one hand and the largest cross-sectional dimension in the flow cross section which is delimited by the circumferential step on the other hand is at least 0.5. As a result, the effect of the circumferential step leading to a relevant overlapping of the compressor impeller with regard to the flow of the gas which is to be compressed, as a result of which the operating behavior and especially the performance of the compressor could otherwise be impaired, can especially be avoided.

Understood as "circumferential step" according to the invention is a surface section of the corresponding wall of the intake section which is oriented transversely with regard to a longitudinal extent of the intake section or with regard to a rotational axis of the compressor impeller, wherein an edge is preferably formed in the transition from a base surface of this wall into this surface section so that an angle is formed between the base surface and the surface section. This (step) angle can preferably be between 80° and 100° and especially preferably can be approximately 90°.

A circumferential step is considered to be "mouth-free" when the circumferential step does not constitute a delimitation of a fluid channel which opens into the wall which forms the intake section, wherein the fluid channel serves for the introduction of a fluid (gas or liquid) into the intake section. The circumferential step is to be mouth-free because otherwise, as a result of a fluid flow discharging from the merging fluid channel, the disturbing effect, which the circumferential step has on the vortex flow, can be compensated or at least impaired.

According to another feature of the invention, the circumferential step is formed as a circumferentially continuous step or a circumferentially segmented step.

It has proved to be particularly effective with regard to a disturbance of the propagation of the vortex flow if the circumferential step is of encompassing design, i.e. extending over the entire circumference of the wall. This can be provided in a closed encompassing manner (i.e. in ring-like form) or in an open encompassing manner (i.e. in helical or spiral-like form). In this case, an encompassing circumferential step can be configured to be continuous or segmented, i.e. with at least one break (no circumferential step is therefore formed in its region). A continuously encompassing circumferential step, which can also have a varying step height over the circumferential extent, can prove to be particularly effective with regard to a disturbance of the propagation of the backflowing vortex flow, whereas other advantages can be realized by a segmented circumferential step, such as a targeted influencing of a flow of fresh gas in the operating flow direction, i.e. in the intake section in a direction toward the compressor impeller. For a sufficient disturbance effect of a segmented circumferential step it should be provided that the circumferential length of all the segments is at least 50%, 60%, 70%, 80% or 90% of the corresponding overall circumference inside the intake section.

According to another feature of the invention, a transition from the circumferential step into a section of the wall facing away from the compressor impeller is formed as a step-free transition.

Since by means of the circumferential step only the backflowing vortex flow is to be disturbed as far as possible, it can preferably be provided that a transition from the circumferential step into the section of the wall facing away from the compressor impeller is of step free design and furthermore is preferably of continuous, for example conically widening, design. As a result of this embodiment, a negative influencing of a flow of fresh gas in the operating flow direction can especially be avoided.

According to another feature of the invention, additionally a longitudinal step oriented perpendicular to an inlet plane of the compressor impeller is provided.

In a preferred embodiment of a compressor according to the invention, provision can preferably additionally be made for a (preferably also mouth-free) longitudinal step oriented perpendicularly to an inlet plane of the compressor impeller, by means of which a disturbance of the circumferentially oriented flow component of the backflowing vortex flow can especially be achieved. At the same time, such a longitudinal step can lead to an only small influencing of the gas flow to be compressed which flows toward the compressor impeller. A combination of a circumferential step with a longitudinal step can advantageously lead to an effective suppression of the backflowing vortex flow even when the circumferential step is of relatively small design, i.e. especially with a relatively small step height so that its effect upon the gas flow flowing in the operating flow direction can also be small. It can preferably be provided that a longitudinal step is formed by a rib-like bar which, with regard to a longitudinal axis of the intake section, projects for example radially into the intake section.

Such a bar can also be formed with an arc-shaped or angled longitudinal extent, as a result of which this can combine a circumferential step and a longitudinal step in one component. It is also possible to form a circumferential step solely by means of such a bar which does not extend parallel to the longitudinal axis of the intake section.

According to another feature of the invention, a gas conducting pipe is provided; the compressor casing forms an intake duct; the gas conducting pipe is connected to the intake duct; the circumferential step is disposed in a location selected from the group including the intake duct, the gas conducting pipe, and a transition between the intake duct and the gas conducting pipe.

According to a further feature of the invention, a gas conducting pipe is provided; the compressor casing forms an intake duct; the gas conducting pipe is connected to the intake duct, wherein the circumferential step is formed by a transition between the intake duct and the gas conducting pipe.

According to yet another feature of the invention, a gas conducting pipe is provided; the compressor casing forms an intake duct; the gas conducting pipe is connected to the intake duct; the circumferential step and/or the longitudinal step is disposed in a location selected from the group including the intake duct, the gas conducting pipe, and a transition between the intake duct and the gas conducting pipe.

According to another feature of the invention, a gas conducting pipe is provided; the compressor casing forms an intake duct; the gas conducting pipe is connected to the intake duct, wherein the circumferential step and/or the longitudinal step is formed by a transition between the intake duct and the gas conducting pipe.

Thus, according to a feature of the invention, the circumferential step and/or the longitudinal step is disposed in an intake duct which is formed by the compressor casing or is disposed in a gas conducting pipe which is connected to the intake duct or in the transition between the intake duct and the gas conducting pipe or is formed by this transition.

The circumferential step and/or the longitudinal step can advantageously be arranged in an intake duct which is formed by the compressor casing or in a gas conducting pipe which is connected to the intake duct. The intake duct, the gas conducting pipe (or a section thereof) and, if applicable, a step component which forms the circumferential step and/or the longitudinal step can in this case form the intake section of the compressor according to the invention. It can also be advantageously possible to arrange the circumferential step in a transition between the intake duct and the gas conducting pipe or to allow the circumferential step to be formed by this transition. To this end, it can be provided for example that the gas conducting pipe in the region of the transition has a smaller opening cross-sectional area than the intake duct of the compressor casing.

According to another feature of the invention, the circumferential step and/or the longitudinal step is formed as a separate step component.

The circumferential step and/or the longitudinal step can advantageously be formed integrally (preferably in one piece) in the corresponding wall of the intake section. In this way, an additional outlay which is attributable to the integration of the circumferential step and/or of the longitudinal step during the assembly of the compressor or of a fresh gas tract, integrating the compressor, of an internal combustion machine can be avoided. On the other hand, such an integral embodiment of the circumferential step and/or of the longitudinal step in the wall of the intake section can be accompanied by higher production costs for the corresponding component (compressor casing or gas conducting pipe) so that it can possibly be more advantageous to allow the circumferential step and/or the longitudinal step to be formed by a separate one-piece or multi-piece step component. In this case, this step component can advantageously be fixedly arranged in the transition between the intake duct and the gas conducting pipe. By the same token, it can be provided to arrange the step component in for example a circumferential groove in the wall of the intake section in a fixed manner (at least with regard to the longitudinal direction of the intake section).

According to another feature of the invention, the separate step component is formed from an elastic material.

In a furthermore preferred embodiment of such a compressor according to the invention, it can be provided that the step component is (at least partially) formed from an elastic material. Understood by "elastic material" in this case is a material the elasticity of which is measured, i.e. designed, so that the step component, as a result of an impingement by a flow of fresh gas, be it in the operating flow direction or opposite thereto (and therefore especially in the form of the vortex flow which is to be disturbed), is functionally deformed to a relevant extent. By means of such an elastic step component, a positive influencing of a flow of the gas which is to be compressed can be achieved or at least a negative influencing of this flow as a result of especially the circumferential step can be minimized as far as possible.

According to another feature of the invention, the separate step component is configured such that the flow cross section, which is delimited by the circumferential step, can be widened when impinged by the gas in the operating flow direction.

According to yet another feature of the invention, the separate step component is configured such that the flow cross section, which is delimited by the circumferential step and/or the longitudinal step, can be widened when impinged by the gas in the operating flow direction.

Thus, according to a feature of the invention, the step component is configured in such a way that the flow cross section which is delimited by the circumferential step and/or the longitudinal step can be widened in the operating flow direction during an impingement by the gas.

To this end, it can especially be provided that the step component is configured in such a way that the flow cross section which is delimited by the circumferential step can be widened during an impingement by the gas in the operating gas direction. In the opposite flow direction, and therefore especially during an impingement of the circumferential step by the vortex flow which is to be disturbed, it can be provided, however, that the shape and in particular the size of the circumferential step does not alter or possibly even increases in comparison to the unloaded neutral position. In this way, it can be achieved that the flow cross section that is cleared by the circumferential step, is as large as possible during a flow of the gas to be compressed in the operating flow direction (and especially providing it is not impinged upon by a vortex flow which is to be disturbed), whereas this cross section narrows as a result of an elastic deformation of the component which forms the circumferential step as soon as this is impinged upon by the vortex flow which is to be disturbed. A constructionally simple embodiment of such a step component can provide that the step component is in at least one section embodied in the form of a ring which tapers in a funnel-like manner in the direction of the compressor impeller, therefore an angle between the section of the wall of the intake section which faces the compressor impeller and adjoins the ring and the surface of the ring which forms the circumferential step is less than 90°.

According to another feature of the invention, the ratio of the shortest distance between the compressor impeller and the circumferential step to the largest cross-sectional dimension in the flow cross section delimited by the circumferential step is in a value range selected from the group including 0.5 to 1.5, 0.8 to 1.2, and substantially 1.

According to a further feature of the invention, a ratio of the shortest distance between the compressor impeller and the circumferential step or the longitudinal step to the largest cross-sectional dimension in the flow cross section, which is delimited by the circumferential step and/or the longitudinal step, is in a value range selected from the group including 0.5 to 1.5, 0.8 to 1.2, and substantially 1.

For a particularly efficient disturbance of the backflowing vortex flow, it can preferably be provided that the ratio of the shortest distance between the compressor impeller and the circumferential step and/or the longitudinal step on the one hand and the largest cross-sectional dimension in the flow cross section which is delimited by the circumferential step and/or the longitudinal step (and especially the inside diameter in the case of a circular flow cross section) on the other hand is between 0.5 and 2.0, preferably between 0.5 and 1.5, more preferably between 0.8 and 1.2, and especially preferably is approximately 1. Such a ratio can especially preferably be provided for the circumferential step, whereas a longitudinal step can extend closer to, and possibly right up to, the compressor impeller.

For example, it can be advantageously provided that the shortest distance between the compressor impeller and (especially) the circumferential step and/or the longitudinal step is 70 mm at most, preferably 20 mm at most.

According to another feature of the invention, the circumferential step has a step height, wherein a ratio of the step height to the largest cross-sectional dimension in the flow cross section delimited by the circumferential step is in a value range selected from the group including 0.03 to 0.16, 0.04 to 0.12, and 0.05 to 0.08.

According to a further feature of the invention, the longitudinal step has a step height, wherein a ratio of the step height to the largest cross-sectional dimension in the flow cross section, which is delimited by the circumferential step and/or the longitudinal step, is in a value range selected from the group including 0.03 to 0.16, 0.04 to 0.12, and 0.05 to 0.08.

It can thus furthermore be provided that the ratio of the step height (possibly the largest step height in the case of a circumferential step or longitudinal step with inconstant step height) to the largest cross-sectional dimension in the flow cross section (and in particular to the inside diameter in the case of a circular flow cross section) which is delimited by the circumferential step and/or the longitudinal step is between 0.03 and 0.16, preferably between 0.04 and 0.12, and especially preferably between 0.05 and 0.08.

For example, it can be provided that the step height of the circumferential step and/or of the longitudinal step is between 1 mm and 6 mm, and preferably between 1.5 mm and 4.5 mm.

Understood as "step height" is the extent of the circumferential step or of the longitudinal step perpendicularly and in particular radially to the longitudinal axis of the intake section.

It can possibly also be advantageous if provision is made for a plurality of circumferential steps which have different shortest distances from the compressor impeller. Such an embodiment can bring about a particularly pronounced disturbance of the backflowing vortex flow.

With the objects of the invention in view, there is also provided an exhaust gas turbocharger including:
  a turbine;
  a compressor having a compressor casing, a compressor impeller rotatably mounted in the compressor casing, a wall delimiting an intake section, the intake section being disposed upstream of the compressor impeller in an operating flow direction of a gas to be compressed, a circumferential step integrated into the wall, the circumferential step being a mouth-free circumferential step facing the compressor impeller; and
  the circumferential step delimiting a flow cross section, wherein a ratio of a shortest distance between the compressor impeller and the circumferential step to a largest cross-sectional dimension in the flow cross section delimited by the circumferential step is at least 0.5.

The compressor can preferably be part of an exhaust gas turbocharger for an internal combustion machine. The invention therefore also relates to an exhaust gas turbocharger having a compressor according to the invention and a turbine. The turbine can comprise a turbine casing and a turbine impeller which is arranged inside a flow chamber of the turbine housing, wherein the turbine impeller is connected to the compressor impeller in a manner fixed against relative rotation, which enables the transfer of torque, which during through-flow of the turbine impeller is exerted upon this, to the compressor impeller in order to rotatably drive this, as a result of which a compression of a gas conducted through the compressor can be achieved.

The compressor according to the invention can be configured to be driven in other ways (other than by an exhaust gas turbine). For example, the compressor impeller can be configured to be driven by means of an output shaft of a combustion engine of an internal combustion machine (frequently referred to as "supercharger" in automobile technology) or driven by means of an electric motor (frequently referred to as "booster" in automobile technology).

With the objects of the invention in view, there is further provided an internal combustion machine including:
  a combustion engine having at least one combustion chamber formed therein, a fresh gas tract, via which fresh gas can be supplied to the at least one combustion chamber, an exhaust gas tract, via which exhaust gas can be discharged from the at least one combustion chamber, and a compressor integrated into the fresh gas tract;
  the compressor having a compressor casing, a compressor impeller rotatably mounted in the compressor casing, a wall delimiting an intake section, the intake section being disposed upstream of the compressor impeller in an operating flow direction of a gas to be compressed, a circumferential step integrated into the wall, the circumferential step being a mouth-free circumferential step facing the compressor impeller; and
  the circumferential step delimiting a flow cross section, wherein a ratio of a shortest distance between the compressor impeller and the circumferential step to a largest cross-sectional dimension in the flow cross section delimited by the circumferential step is at least 0.5.

Furthermore, the invention also relates to an internal combustion machine with a combustion engine (especially reciprocating combustion engine), forming one or more combustion chambers, a fresh gas tract, via which fresh gas can be supplied to the combustion chambers, an exhaust gas tract, via which exhaust gas can be discharged from the combustion chambers, and a compressor according to the invention or an exhaust gas turbocharger according to the invention, wherein the compressor is integrated into the fresh gas tract and the turbine of the exhaust gas turbocharger, if provided, is integrated into the exhaust gas tract.

The compressor/exhaust gas turbocharger/internal combustion machine, all according to the invention, can especially be provided for use in a motor vehicle, especially a wheel-based motor vehicle (especially a passenger car or freight vehicle). In this case, the internal combustion machine can especially be provided for creating a propulsive power for the motor vehicle.

The indefinite articles ('a' and can'), especially in the patent claims and in the description which generally explains the patent claims, are to be understood as such and not as numerical words. Correspondingly, components which are substantiated thereby are therefore to be understood so that these are present at least once and can be present multiple times.

Although the invention is illustrated and described herein as embodied in a compressor, an exhaust gas turbocharger, and an internal combustion machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE SEVERAL VIEWS OF THE DRAWING

FIG. 5 is a longitudinal sectional view of a compressor according to the invention in a further embodiment;

FIG. 6 is a front elevational view of the step component according to the invention which is used for forming the circumferential step in the compressor according to FIG. 5;

FIG. 11 is a longitudinal sectional view of a compressor according to the invention in a further embodiment;

FIG. 12 is a front elevational view of the step component according to the invention which is used for forming the circumferential step in the compressor according to FIG. 11;

FIG. 13 is a longitudinal sectional view of a compressor according to the invention in a further embodiment;

FIG. 14 is a front elevational view of the step component according to the invention which is used for forming the circumferential step in the compressor according to FIG. 13;

FIG. 22 is a longitudinal sectional view of a further embodiment of a compressor according to the invention.

DETAILED DESCRIPTION OF THE INVENTION

Figure 1:
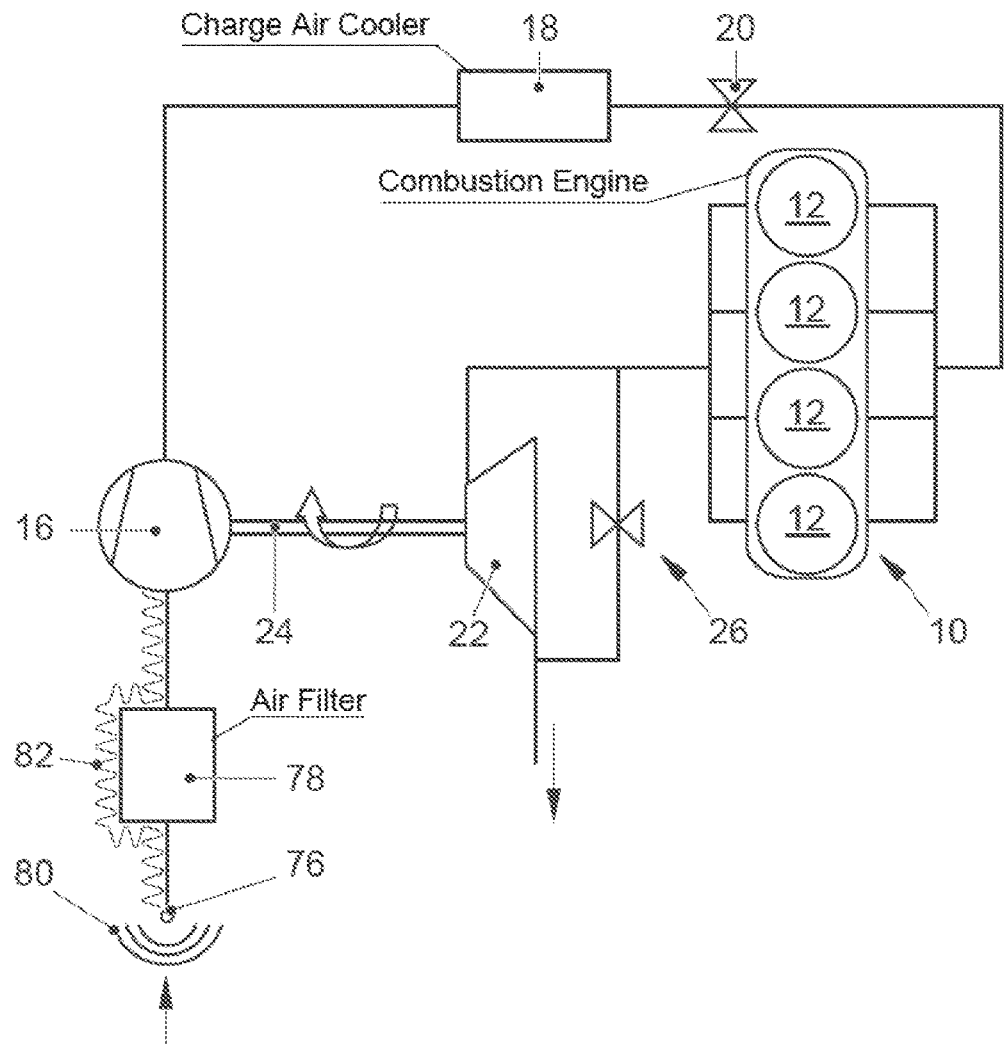
FIG. 1 is a schematic view of a first embodiment of an internal combustion machine with a compressor according to the invention.

Referring now to the figures of the drawing in detail and first, particularly, to FIG. 1 thereof, there is shown a schematic view of an internal combustion machine with a combustion engine 10 which forms a plurality of cylinders 12. The cylinders 12 together with pistons which are guided up and down therein and a cylinder head (not shown) delimit combustion chambers in which fresh gas (air) is combusted together with fuel, as a result of which the pistons are moved cyclically up and down. This movement of the pistons is transmitted in a known manner to a crankshaft 14, which is not shown in FIG. 1, (cf. FIG. 2), and thus drives it in a rotating manner. The fresh gas is fed to the combustion engine 10 via a fresh gas tract and for this is inducted via an intake mouth 76 from the environment, cleaned in an air filter 78 and then conducted into a compressor 16 according to the invention which is part of an exhaust gas turbocharger. The fresh gas is compressed by means of the compressor 16, then cooled in a charge air cooler 18, and, controlled by means of a throttle valve 20, fed to the combustion chambers. The drive of the compressor 16 is carried out by means of a turbine 22 which is integrated into an exhaust gas tract of the internal combustion machine. Exhaust gas, which is produced during the combustion of the fuel-fresh gas mixture in the combustion chambers of the combustion engine 10, is discharged from the combustion engine 10 via the exhaust gas tract and in the process flows through the turbine 22. This, in a known manner, leads to a rotating drive of a turbine impeller which in turn is connected via a shaft 24 in a rotation-resistant manner to an impeller of the compressor 16. The rotating drive of the turbine impeller is therefore transmitted to the compressor impeller. In order to limit the pressure build up in the fresh gas tract during an operation of the combustion engine 10 at high rotational speeds and loads, the turbine 22 can be bypassed in a known manner by means of a so-called waste gate 26.

Figure 2:
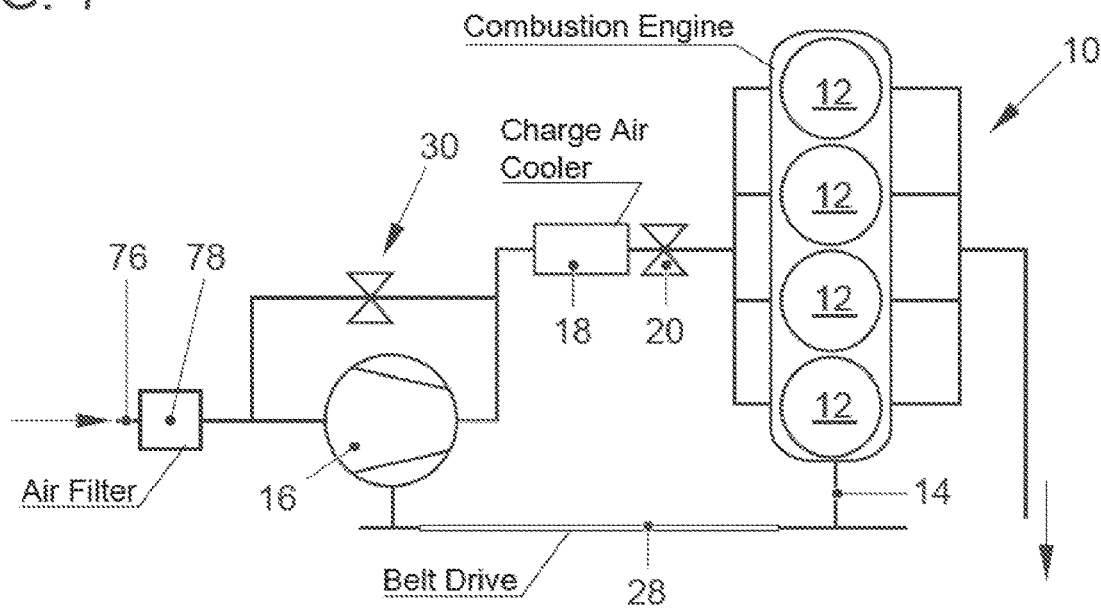
FIG. 2 is a schematic view of a second embodiment of an internal combustion machine with a compressor according to the invention.

In the case of the internal combustion machine according to FIG. 2, the compressor 16, integrated into the fresh gas tract, is mechanically driven, i.e. by the crankshaft 14 of the combustion engine 10 by means of a belt drive 28. Since in this case the rotational speed of the compressor impeller is proportional to the rotational speed of the crankshaft 14 of the combustion engine 10, the possibility exists of limiting the pressure build up by the compressor 16 at high rotational speeds of the crankshaft 14 in a known manner by means of a compressor bypass 30.

Figure 3:
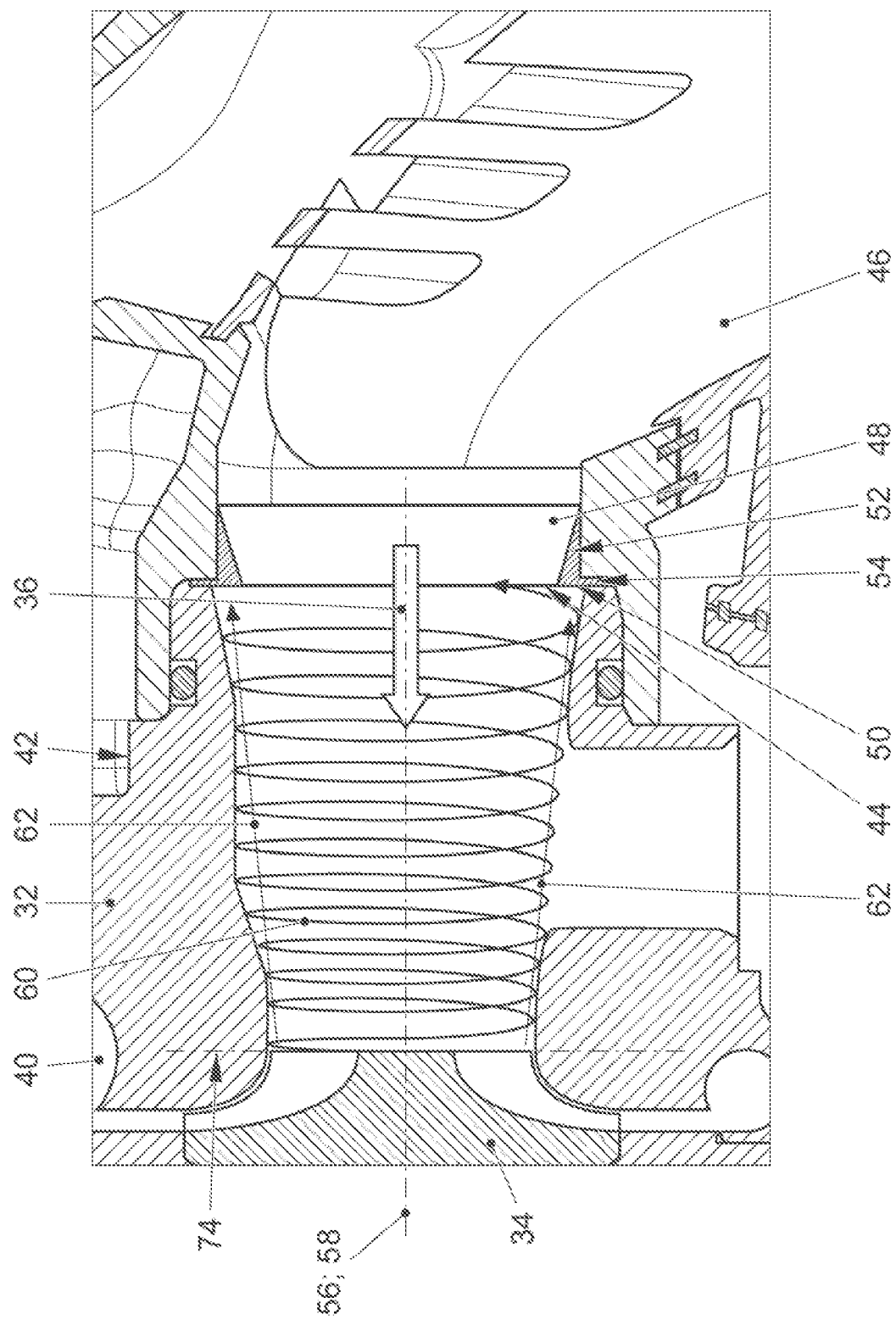
FIG. 3 is a longitudinal sectional view of a compressor according to the invention in a first embodiment.

FIG. 3 schematically shows a longitudinal section through a (radial) compressor 16 according to the invention, which for example can be used in one of the internal combustion machines according to FIGS. 1 and 2. Shown is a part of a compressor casing 32, which forms a flow chamber, within which a compressor impeller 34 is rotatably mounted. The compressor impeller 34 separates the flow chamber into a low-pressure chamber 38 which is located longitudinally axially upstream (with regard to an operating flow direction 36 of the fresh gas which is to be compressed) of the compressor impeller 34 and into a high-pressure chamber 40 which radially encompasses the compressor impeller 34. The low-pressure chamber 36, which is formed in an intake duct 42 formed by the compressor casing 32, terminates in a compressor inlet 44, whereas a (not visible in FIG. 3) compressor outlet is formed in the high-pressure chamber 40. By means of the compressor inlet 44 and the compressor outlet, the compressor casing 32 can be integrated into a fresh gas tract of an internal combustion machine, as is shown in FIGS. 1 and 2.

Connected to the compressor inlet 44 as part of the compressor 16 according to the invention is a section of a gas conducting pipe 46 which can also be part of a fresh gas tract of an internal combustion machine. The low-pressure chamber 38 or the intake duct 42 of the compressor casing 32, together with this section of the gas conducting pipe 46 and a step component 48 which is arranged in the transition between the intake duct 42 and the gas conducting pipe 46, form an intake section, into the delimiting wall of which a circumferential step 50, facing the compressor impeller 34, is integrated according to the invention. This circumferential step 50 is formed by a wall surface of the step component 48. The step component 48, which if applicable can be formed from an elastic material (e.g. from an elastomer), has an annular effective section 52 and a likewise annular fastening section 54 which extends outward in the radial direction from the one longitudinally axial end of the effective section 52. The effective section 52 of the step component 48 is positioned in the end section of the gas conducting pipe 46 which forms the transition from the intake duct 42 of the compressor casing 32 to the gas conducting pipe 46 and in this case butts by its outer side with as little clearance as possible against the inner side of the gas conducting pipe 46. The fastening section 54 on the other hand is positioned inside a radial gap which is formed in the transition from the intake duct 42 to the gas conducting pipe 46 and therefore fixes the step component 48 at least in the longitudinally axial direction (with regard to a longitudinal axis 56 of the intake duct 42 which is oriented coaxially (or at least parallel) to a rotational axis 58 of the compressor impeller 34). The annularly encompassing basic body of the effective section 52 has a wedge-shaped cut face in longitudinal section so that the flow cross section, which is delimited by the step component 48, continuously tapers with regard to the operating flow direction 36 of a (fresh) gas which is to be compressed by means of the compressor 16 until reaching the end face of the effective section 52 which forms the circumferential step 50. This continuous tapering of the flow cross section which is delimited by the step component 48 basically prevents a negative influence of a flow of the (fresh) gas in the operating flow direction 36. The end face of the effective section 52 which forms the circumferential step 50 is on the other hand oriented at an angle of approximately 90° to the section of the wall of the intake duct 42 which directly adjoins this end face and delimits the low-pressure chamber 38.

The circumferential step 50 which is formed by the step component 48, faces the compressor impeller 34 and is oriented parallel to an inlet plane 74 of the compressor impeller constitutes a significant flow resistance for a vortex flow 60 close to the wall, shown in simplified form in FIG. 3, which has a movement component 62 opposite to the operating flow direction 36 of the fresh gas which is to be compressed. This vortex flow 60 constitutes a backflow of already compressed fresh gas from the high-pressure chamber 40 via the compressor impeller 34 into the low-pressure chamber 38 which without the circumferential step 50 provided according to the invention would continue to a relevant extent right into the gas conducting pipe 46 and as a result of its thinner walled design in comparison to the intake duct 42 of the compressor casing 32 (and if applicable the design of the gas conducting pipe 46 from plastic instead of a metal as in case of the compressor casing 32) would lead to a considerable vibration excitation, partially in the range of the natural frequencies, of the wall of the gas conducting pipe 46. Not only a direct radiation of airborne noise 80 via the intake mouth 76 but also of structure-borne noise 82 via the gas conducting pipes of the intake section of the fresh gas tract would be caused by this, as is shown in FIG. 1. Such a backflowing vortex flow 60 occurs especially when after an operation of the internal combustion machine with the throttle valve 20 wide open this throttle valve 20 is (largely or completely) closed relatively quickly, which leads to a reduced rotational speed of the compressor impeller 34 only after a delay and therefore to a reduced compression output of the compressor 16. For a brief period, the compressor impeller 34 therefore continues to deliver fresh gas at a relatively high delivery rate into the charge air section of the fresh gas tract adjoining the compressor outlet, wherein the delivered fresh gas cannot be conducted as far as the combustion engine 10 as a result of the closed throttle valve 20. Therefore, a brief, unusually large pressure increase is created inside the high-pressure chamber 40 and a correspondingly large pressure difference in comparison to the gas pressure in the low-pressure chamber 38, which leads to an intensified backflow of already compressed fresh gas, wherein this backflow flows from the compressor impeller 34 in the form of the vortex flow 60.

The vortex flow 60 flowing inside the intake duct 42 in the direction of the compressor inlet 44 impinges upon the circumferential step 50 which is formed by the step component 48 and as a result is disturbed during an overflow into the gas conducting pipe 46 and is at least partially reflected in the process. In this way, vibration excitation of the wall of the gas conducting pipe 46 and therefore noise generation is reduced.

Opening into the low-pressure chamber of the compressor 16 in the radial direction is a connection via which crankcase gases ("blow-by gases"), which for avoiding the creation of an overpressure in a crankcase of the combustion engine 10 are sucked out of this, can be introduced into the fresh gas tract after cleaning (especially de-oiling and if necessary also filtering). It could be established that the provision of the circumferential step 50 in the intake section of the compressor 16 and the disturbance of the backflowing vortex flow 60 effected by this does not negatively influence a return of crankcase gas to a relative extent.

Figure 4:
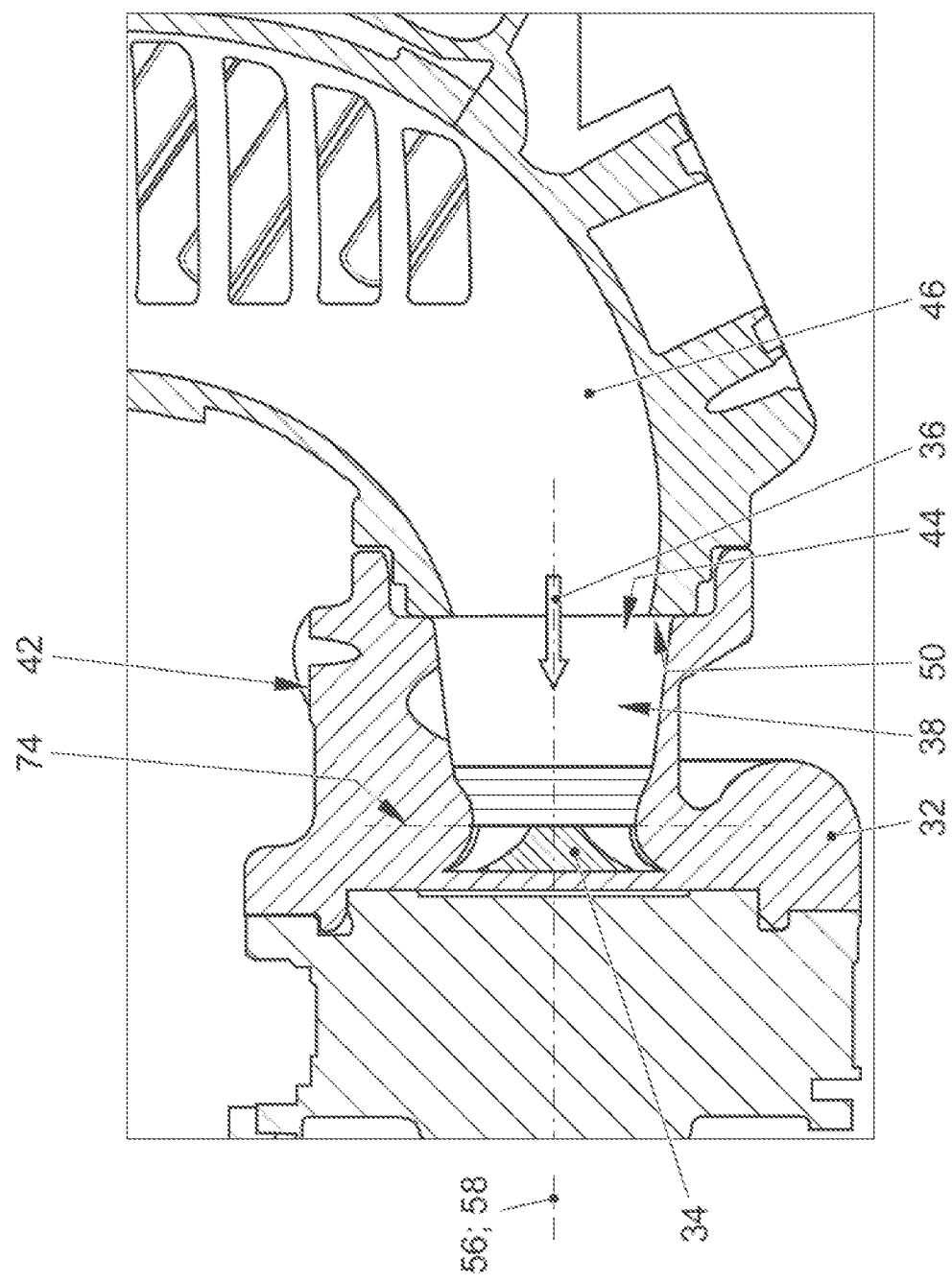
FIG. 4 is a longitudinal sectional view of a compressor according to the invention in a further embodiment.

The embodiment shown in FIG. 4 of a compressor 16 according to the invention differs from that of FIG. 3 basically to the effect that the circumferential step 50 is not formed by a separate step component 48 but by the transition between the intake duct 42 and the gas conducting pipe 46 itself. To this end, the end of the gas conducting pipe 46 which forms this transition has a correspondingly smaller flow cross section than the compressor inlet 44 so that the circumferential step 50 is formed by the corresponding end wall of the gas conducting pipe 46.

Figure 9:
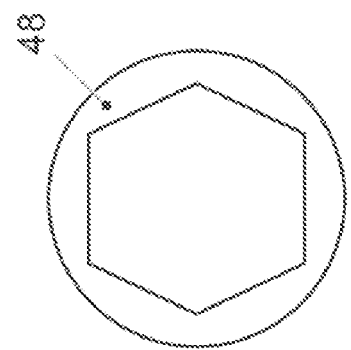
FIGS. 7 to 9 are front elevational views of alternative embodiments of the step component according to the invention.
Figure 8:
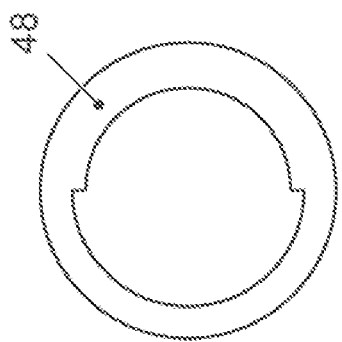
Figure 7:
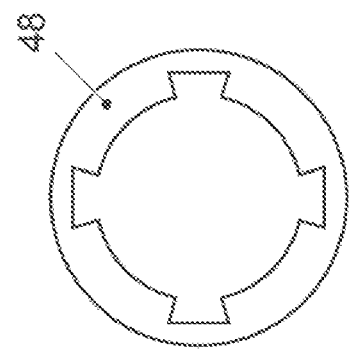

In the case of the embodiment of a compressor 16 according to the invention according to FIG. 5, the circumferential step 50 is formed in turn by a separate step component 48 which is arranged inside the transition between the intake duct 42 of the compressor casing 32 and the gas conducting pipe 46, wherein the step component 48 can for example be embodied in the form of a simple flat ring with constant inside and outside diameter (cf. FIG. 6). Alternatively to this, the ring-like step component 48 can also be embodied such that it has an inside diameter which is inconstant in the circumferential direction, as is shown in FIGS. 7 to 9 by way of example for different embodiments. On account of this inconstant inside diameter, an inconstant step height (i.e. radial extent of that end face of the respective step component 48 which forms the circumferential step 50 facing the compressor impeller) is created over the circumference in each case.

Figure 10:
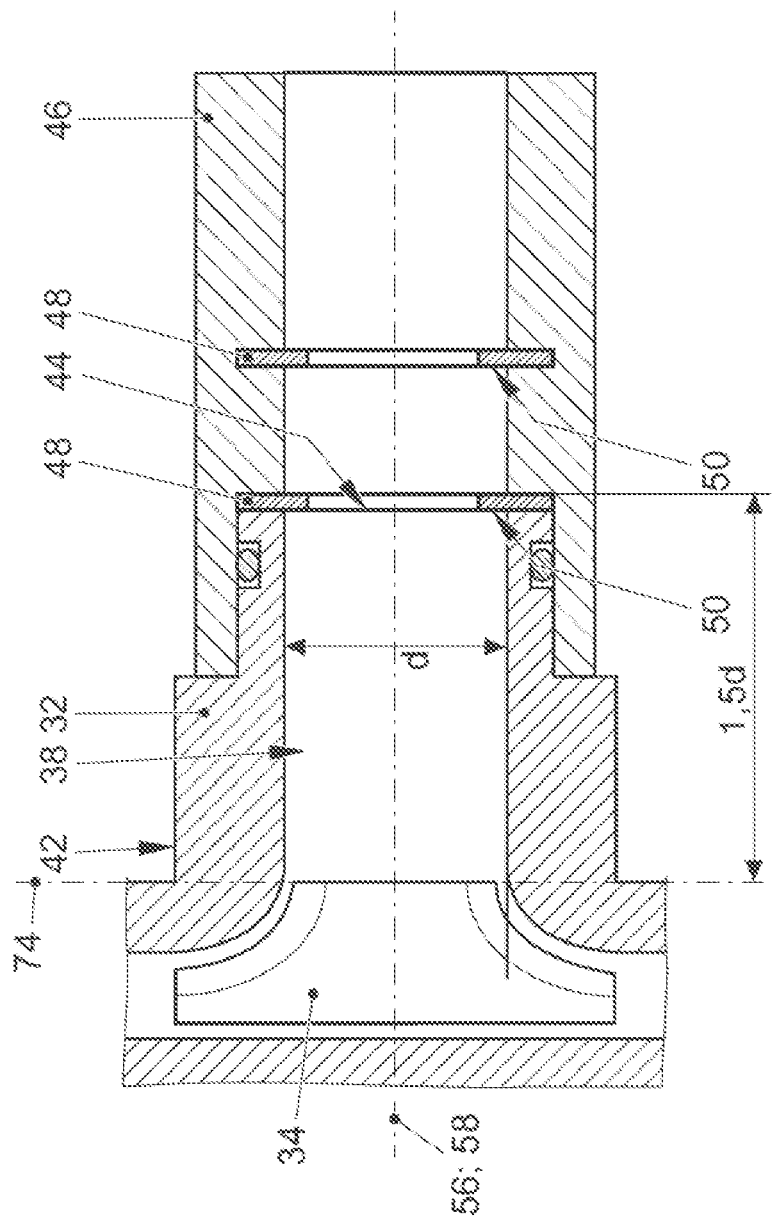
FIG. 10 is a longitudinal sectional view of a compressor according to the invention in a further embodiment.

The embodiment of a compressor 16 according to the invention according to FIG. 10 differs from that according to FIG. 5 especially in that in addition to the step component 48 which is arranged in the transition between the intake duct 42 and the gas conducting pipe 46 and forms a first circumferential step 50 a further ring-like step component 48 is arranged inside the gas conducting pipe 46 and is fixed in this for example by seating in an encompassing groove. This further step component 48 forms a second circumferential step 50 facing the compressor impeller 34. As a result of the combined effect of both circumferential steps 50 a propagation of a backflowing vortex flow 60 can be prevented or disturbed if necessary in a particularly efficient manner. The embodiment of the two step components 48 can in this case be arbitrary, for example corresponding to FIGS. 6 to 9.

In the embodiment of a compressor 16 according to the invention according to FIGS. 11 and 12, a segmented circumferential step 50 is formed by a step component 48, which is arranged in the proximity of the transition between the intake duct 42 and the gas conducting pipe 46, by provision being made for a plurality of bar-like (bar-shaped) elements 64 which are arranged on an encompassing strip and extend radially with regard to the longitudinal axis of the intake duct 42. The shortest distance between the individual bar-like elements 64 and the compressor impeller 34 is different for some of these.

Figure 15:
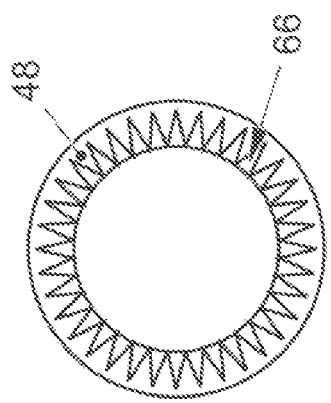
FIG. 15 is a front elevational view of an alternative embodiment of the step component according to the invention in a compressor according to FIG. 14.

FIGS. 13 and 14 show another embodiment of a compressor 16 according to the invention with a step component 48 which forms a circumferential step 50, which is characterized in that recesses 66 (with V-shaped cross section), which extend, distributed over its circumference, in curved manner (with regard to a longitudinal axis of the step component 48) and which extend over the entire longitudinally axial extent of this step component 48, are introduced into this. These recesses 66 can serve for introducing a flow vortex into a flow of fresh gas which is guided by the step component 48, which vortex flow during a flow of fresh gas in the operating flow direction 36 can have a positive effect on the inflow of the compressor impeller 34. With regard to the vortex flow 60 which is to be disturbed, the orientation of the recesses 66 extending in a curved manner can be such that these counteract the vortex of this vortex flow, as a result of which a further improved effect of the circumferential step 50 can be achieved with regard to the targeted avoidance of noise generation by the vortex flow 60. FIG. 15 shows one more slightly modified embodiment in relation to the step component 48 according to FIG. 14, in which adjacent recesses 66 directly join each other.

Figure 16:
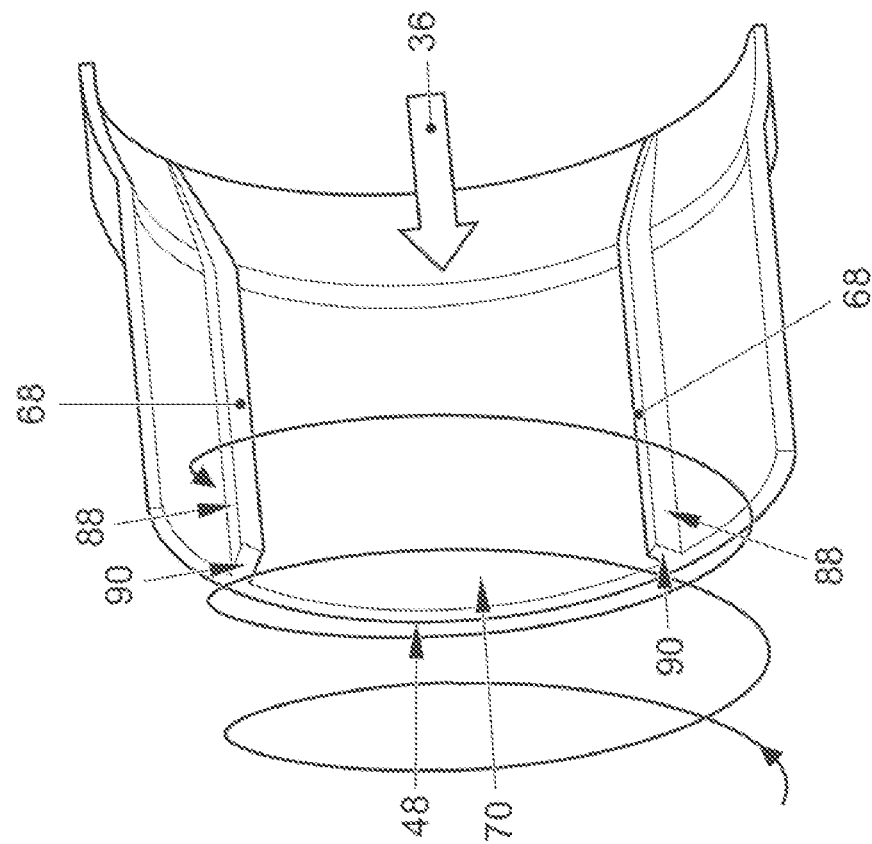
FIG. 16 is a longitudinal sectional perspective view of a further embodiment of a step component for a compressor according to the invention.
Figure 17:
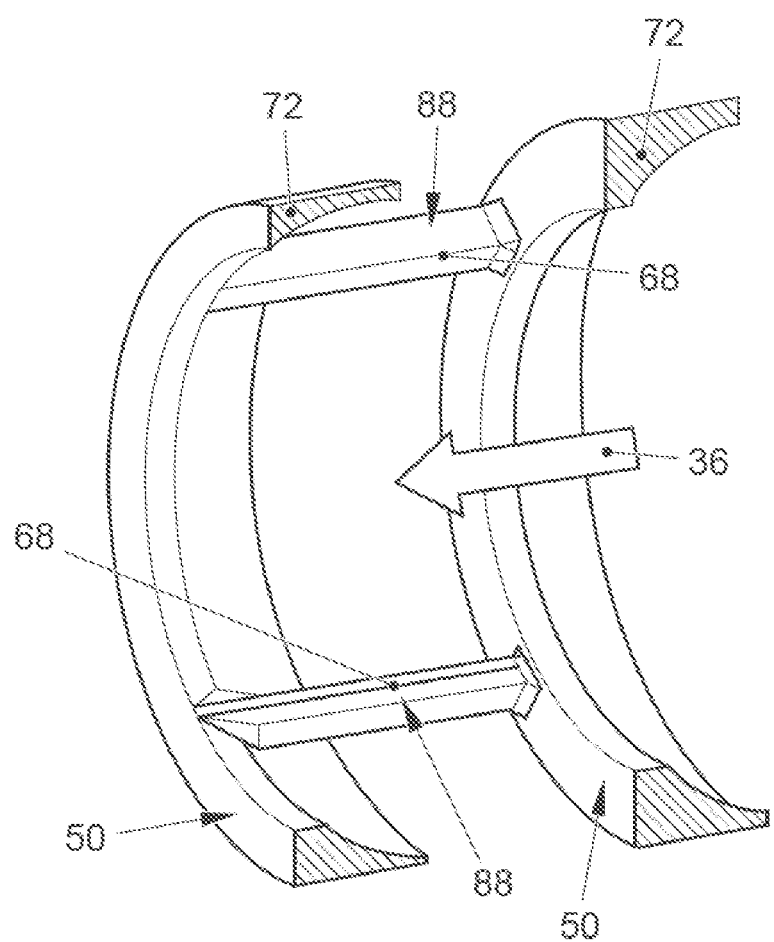
FIG. 17 is a longitudinal sectional perspective view of a further embodiment of a step component for a compressor according to the invention.
Figure 18:
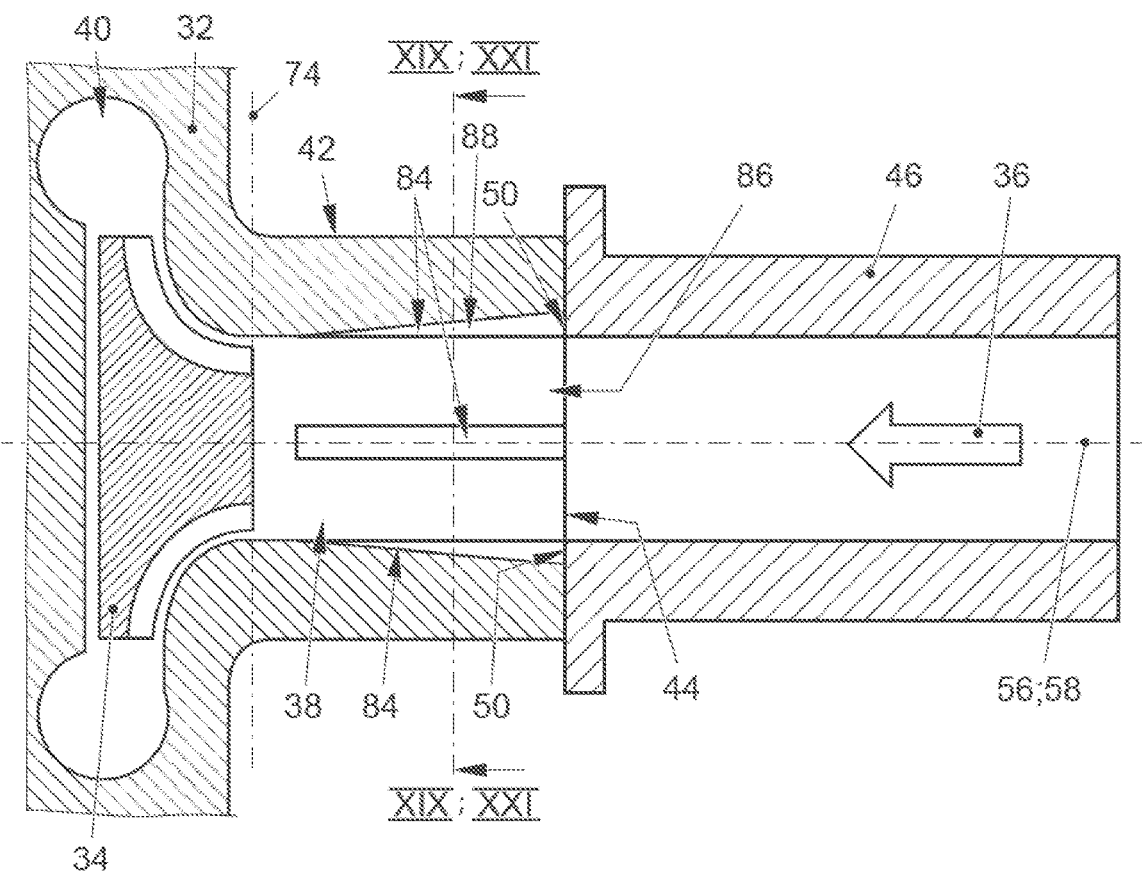
FIG. 18 is a longitudinal sectional view of a further embodiment of a compressor according to the invention.
Figure 19:
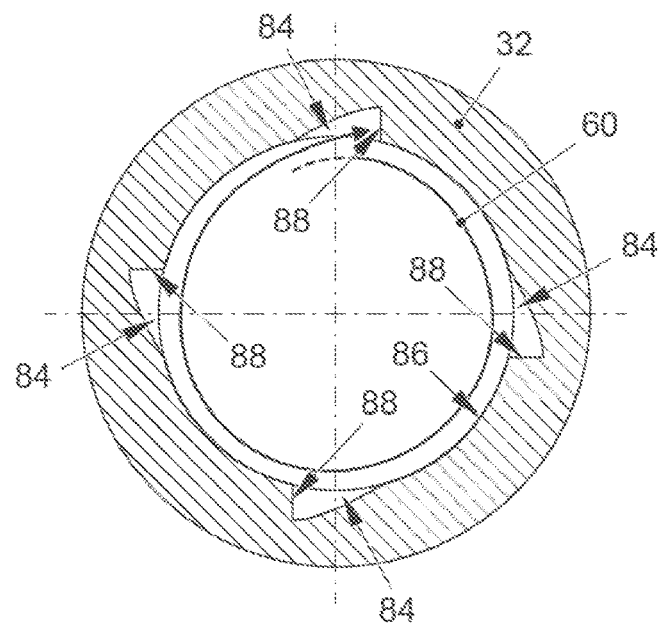
FIG. 19 is a cross-sectional view of the compressor along the sectional plane XIX-XIX in FIG. 18 in accordance with the invention.
Figure 20:
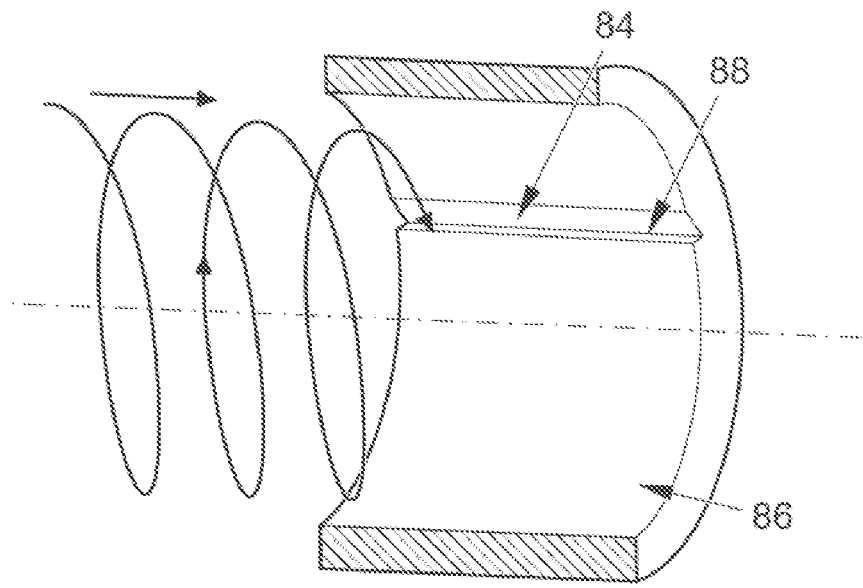
FIG. 20 is a perspective longitudinal sectional view of a section of the intake duct of the compressor according to FIGS. 18 and 19 in accordance with the invention.

FIGS. 16 and 17 show further embodiments of step components 48 which can be provided for integration into the intake section of a compressor 16 according to the invention. These embodiments are characterized in that longitudinal steps 88 are formed and are oriented perpendicularly to the inlet plane 74 of an associated compressor impeller 34 and therefore also parallel to the longitudinal axis 56 of the intake section.

In the case of the step component 48 according to FIG. 16, these longitudinal steps 88, which are oriented perpendicularly to the inlet plane 74 of the compressor impeller 34, are formed by bars 68 which extend in the longitudinal direction of the intake section and are integrated into a tubular wall section 70 of the step component 48. In this case, the bars 68 are arranged in a distributed manner over the circumference of the wall section 70 with uniform pitch. The ends (end faces 90) of these bars 68 which face the compressor impeller 34 basically form a segmented circumferential step 50 which is oriented parallel to the inlet plane 74 of the compressor impeller 34. On account of the relatively small (surface) size of this circumferential step 50, this, however, has only a relatively small, possibly no measurable, disturbance effect for the backflowing vortex flow 60. For this reason, the longitudinal steps 88 which are formed by the bars 68 should still be combined with a sufficiently large (additional) circumferential step 50 (not shown in FIG. 16). The other ends of the bars 68 are embodied such that they run out (taper off) continuously in the direction of the tubular wall section 70 of the step component 48 and are therefore of step-free design in order to influence as little as possible a flow of fresh gas in the operating flow direction 36.

Formed by the step component 48 according to FIG. 17 are both two steps 50, oriented parallel, and a plurality of steps 50, oriented perpendicularly, with regard to the inlet plane 74 of an associated compressor impeller 34, wherein the steps 50 which are oriented parallel and extend circumferentially in a closed manner are formed by two step rings 72 and the perpendicularly oriented steps 50 are formed by a plurality of bars 68 which interconnect the step rings 50. On the side facing away from the compressor impeller 34, the step rings 72 are of a design which widens in an approximately conical manner (opposite the operating flow direction 36), as a result of which the flow resistance which is created by the step rings 72 is to be kept relatively small for gas flowing in the operating flow direction.

In order to disturb a backflowing vortex flow 60 as efficiently as possible, the bars 68 should be positioned as close as possible to the compressor impeller 34. For example, the (shortest) distance between the compressor impeller 34 and an end of one of the bars 68 facing this can be 60 mm at most. If necessary, a minimum value for this distance, which for example can be 10 mm, can also be sensible. The number of bars 68 distributed over a circumference of the intake section can for example be between one and six.

FIGS. 18 to 21 show a further possible embodiment of a compressor 16 according to the invention which has longitudinal steps 88 oriented perpendicularly to the inlet plane 74 of the compressor impeller 34. The longitudinal steps 88 in this case constitute sections of the delimiting surfaces of recesses 84 which are integrated into the compressor casing 32 in the region of the intake duct 42 and extend in the direction of the longitudinal axis 56 (with regard to a base surface 86, defining a circular cross section, of the wall of the intake duct 42 which delimits the low-pressure chamber 38).

Figure 21:
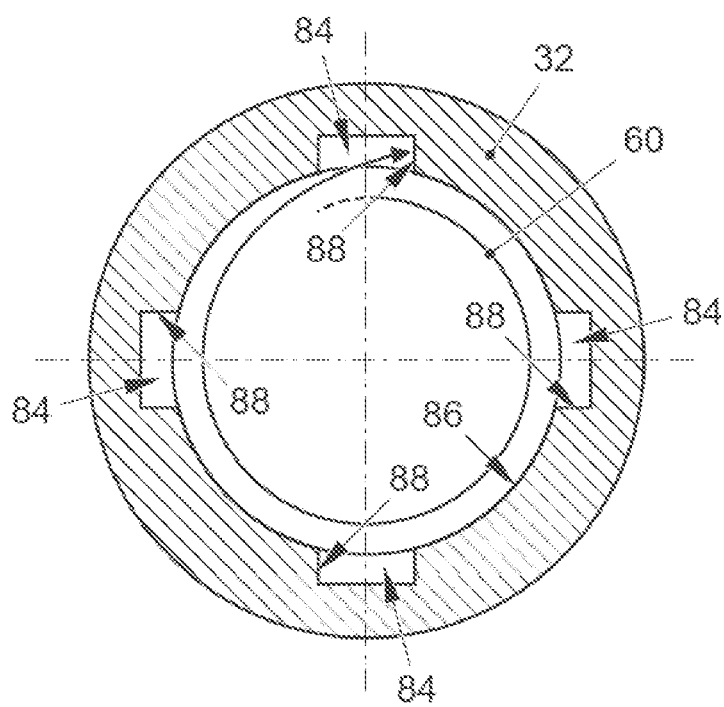
FIG. 21 is a cross-sectional view, corresponding to FIG. 19, of an alternative embodiment of a compressor according to FIG. 18 in accordance with the invention.

The cross sectional areas which are delimited by these recesses 84 can for example be of semi-crescent-shaped design (cf. FIGS. 19 and 20) or of rectangular design (cf. FIG. 21). In the case of these semi-crescent-shaped recesses 84 these should be integrated into the wall of the intake duct 42 in such a way that these become increasingly deeper in the direction of the (main) vortex direction of the vortex flow 60.

For example, between one and six such recesses 84 can be integrated into the wall of the intake duct 42. The step height can in this case be for example between 1 mm and 5 mm. The length of the recesses 84 (in the direction of the longitudinal axis 56) can be for example between 5 mm and 55 mm. It is preferably provided that the recesses 84 become continuously flatter in the direction of the operating flow direction 36 and merge in a step-free manner into the base surface 86 of the wall of the intake duct 42.

The distal ends of the recesses 84, with regard to the compressor impeller 34, constitute circumferential steps 50 or a segmented circumferential step 50. Depending on the number and the dimensions of the recesses 84, the added circumferential length of this circumferential step 50 in comparison to the corresponding overall circumference of the intake section can be relatively small, however, so that in the case of this embodiment a combination with an additional circumferential step 50 (not shown) can also be sensible.

FIG. 22 shows a further possible embodiment of a compressor 16 according to the invention. In this, provision is made for a step component 48 which combines a closed encompassing circumferential step 50 with a plurality (specifically four in a uniform pitch of 90°) of bars 68 which extend in the direction of the compressor impeller 34 from the distal end, with regard to the compressor impeller 34, of a step ring 72 which forms the circumferential step 50. The bars 68 form in each case a longitudinal step 88.

LIST OF REFERENCE CHARACTERS

10 Combustion engine
12 Cylinder
14 Crankshaft
16 Compressor
18 Charge air cooler
20 Throttle valve
22 Turbine
24 Shaft
26 Waste gate
28 Belt drive
30 Compressor bypass
32 Compressor casing 34 Compressor impeller
36 Operating flow direction
38 Low-pressure chamber
40 High-pressure chamber
42 Intake duct
44 Compressor inlet
46 Gas conducting pipe
48 Step component
50 Circumferential step
52 Effective section of the step component
54 Fastening section of the step component
56 Longitudinal axis of the intake duct
58 Rotational axis of the compressor impeller
60 Vortex flow
62 Movement component of the vortex flow
64 Bar-like element
66 Recess
68 Bar
70 Wall section
72 Step ring
74 Inlet plane of the compressor impeller
76 Intake mouth
78 Air filter
80 Airborne noise
82 Structure-borne noise
84 Recess
86 Base surface
88 Longitudinal step
90 End face

What is claimed is:

1. A compressor for an internal combustion machine, comprising:
a compressor casing;
a compressor impeller rotatably mounted in said compressor casing;
a wall delimiting an intake section, said intake section being disposed upstream of said compressor impeller in an operating flow direction of a gas to be compressed;
a circumferential step integrated into said wall, said circumferential step being a mouth-free circumferential step facing said compressor impeller; and
said circumferential step delimiting a flow cross section, wherein a ratio of a shortest distance between said compressor impeller and said circumferential step to a largest cross-sectional dimension in the flow cross section delimited by said circumferential step is at least 0.5.

2. The compressor according to claim 1, wherein said circumferential step is formed as one of a circumferentially continuous step and a circumferentially segmented step.

3. The compressor according to claim 1, wherein a transition from said circumferential step into a section of said wall facing away from said compressor impeller is formed as a step-free transition.

4. The compressor according to claim 1, further including a longitudinal step oriented perpendicular to an inlet plane of said compressor impeller.

5. The compressor according to claim 1, including:
a gas conducting pipe;
said compressor casing forming an intake duct, said gas conducting pipe being connected to said intake duct; and
said circumferential step being disposed in a location selected from the group consisting of said intake duct, said gas conducting pipe, and a transition between said intake duct and said gas conducting pipe.

6. The compressor according to claim 1, including:
a gas conducting pipe; and
said compressor casing forming an intake duct, said gas conducting pipe being connected to said intake duct, wherein said circumferential step is formed by a transition between said intake duct and said gas conducting pipe.

7. The compressor according to claim 4, including:
a gas conducting pipe;
said compressor casing forming an intake duct, said gas conducting pipe being connected to said intake duct; and
at least one of said circumferential step and said longitudinal step being disposed in a location selected from the group consisting of said intake duct, said gas conducting pipe, and a transition between said intake duct and said gas conducting pipe.

8. The compressor according to claim 4, including:
a gas conducting pipe; and
said compressor casing forming an intake duct, said gas conducting pipe being connected to said intake duct, wherein at least one of said circumferential step and said longitudinal step is formed by a transition between said intake duct and said gas conducting pipe.

9. The compressor according to claim 1, wherein said circumferential step is formed as a separate step component.

10. The compressor according to claim 4, wherein at least one of said circumferential step and said longitudinal step is formed as a separate step component.

11. The compressor according to claim 9, wherein said separate step component is formed from an elastic material.

12. The compressor according to claim 10, wherein said separate step component is formed from an elastic material.

13. The compressor according to claim 9, wherein said separate step component is configured such that the flow cross section, which is delimited by said circumferential step, can be widened when impinged by the gas in the operating flow direction.

14. The compressor according to claim 10, wherein said separate step component is configured such that the flow cross section, which is delimited by at least one of said circumferential step and said longitudinal step, can be widened when impinged by the gas in the operating flow direction.

15. The compressor according to claim 1, wherein the ratio of the shortest distance between said compressor impeller and said circumferential step to the largest cross-sectional dimension in the flow cross section delimited by said circumferential step is in a value range selected from the group consisting of 0.5 to 1.5, 0.8 to 1.2, and substantially 1.

16. The compressor according to claim 4, wherein a ratio of the shortest distance between said compressor impeller and one of said circumferential step and said longitudinal step to the largest cross-sectional dimension in the flow cross section, which is delimited by at least one of said circumferential step and said longitudinal step, is in a value range selected from the group consisting of 0.5 to 1.5, 0.8 to 1.2, and substantially 1.

17. The compressor according to claim 1, wherein said circumferential step has a step height and wherein a ratio of the step height to the largest cross-sectional dimension in the flow cross section delimited by said circumferential step is in a value range selected from the group consisting of 0.03 to 0.16, 0.04 to 0.12, and 0.05 to 0.08.

18. The compressor according to claim 4, wherein said longitudinal step has a step height and wherein a ratio of the step height to the largest cross-sectional dimension in the flow cross section, which is delimited by at least one of said circumferential step and said longitudinal step, is in a value range selected from the group consisting of 0.03 to 0.16, 0.04 to 0.12, and 0.05 to 0.08.

19. The compressor according to claim 1, wherein said circumferential step has a step angle and wherein the step angle is in a value range selected from the group consisting of 80° to 100°, and substantially 90°.

20. The compressor according to claim 4, wherein said longitudinal step has a step angle and wherein the step angle is in a value range selected from the group consisting of 80° to 100°, and substantially 90°.

21. An exhaust gas turbocharger comprising:
a turbine;
a compressor having a compressor casing, a compressor impeller rotatably mounted in said compressor casing, a wall delimiting an intake section, said intake section being disposed upstream of said compressor impeller in an operating flow direction of a gas to be compressed, a circumferential step integrated into said wall, said circumferential step being a mouth-free circumferential step facing said compressor impeller; and
said circumferential step delimiting a flow cross section, wherein a ratio of a shortest distance between said compressor impeller and said circumferential step to a largest cross-sectional dimension in the flow cross section delimited by said circumferential step is at least 0.5.

22. An internal combustion machine comprising:
a combustion engine having at least one combustion chamber formed therein, a fresh gas tract, via which fresh gas can be supplied to said at least one combustion chamber, an exhaust gas tract, via which exhaust gas can be discharged from said at least one combustion chamber, and a compressor integrated into said fresh gas tract;
said compressor having a compressor casing, a compressor impeller rotatably mounted in said compressor casing, a wall delimiting an intake section, said intake section being disposed upstream of said compressor impeller in an operating flow direction of a gas to be compressed, a circumferential step integrated into said wall, said circumferential step being a mouth-free circumferential step facing said compressor impeller; and
said circumferential step delimiting a flow cross section, wherein a ratio of a shortest distance between said compressor impeller and said circumferential step to a largest cross-sectional dimension in the flow cross section delimited by said circumferential step is at least 0.5.

* * * * *

UNITED STATES PATENT AND TRADEMARK OFFICE
CERTIFICATE OF CORRECTION

PATENT NO. : 10,655,642 B2
APPLICATION NO. : 15/820493
DATED : May 19, 2020
INVENTOR(S) : Alois Puzik, Thomas Meier and Thilo Lehmann It is certified that error appears in the above-identified patent and that said Letters Patent is hereby corrected as shown below:

On the Title Page

Item (63) should read -- Continuation of application No. PCT/EP2016/059847, filed May 3, 2016. --

Signed and Sealed this
Thirtieth Day of June, 2020

Andrei Iancu
*Director of the United States Patent and Trademark Office*